US012787969B2

(12) United States Patent
Raber

(10) Patent No.: US 12,787,969 B2
(45) Date of Patent: Nov. 10, 2026

(54) COOLING KENNEL THAT DOES NOT REQUIRE AN ELECTRICAL SOURCE

(71) Applicant: Jeremiah Raber, High Ridge, MO (US)

(72) Inventor: Jeremiah Raber, High Ridge, MO (US)

( * ) Notice: Subject to any disclaimer, the term of this patent is extended or adjusted under 35 U.S.C. 154(b) by 0 days.

(21) Appl. No.: 18/962,685

(22) Filed: Nov. 27, 2024

(65) Prior Publication Data

US 2025/0169465 A1 May 29, 2025

Related U.S. Application Data

(60) Provisional application No. 63/603,327, filed on Nov. 28, 2023.

(51) Int. Cl.
*A01K 1/02* (2006.01)
*A01K 1/03* (2006.01)

(52) U.S. Cl.
CPC ............ *A01K 1/0245* (2013.01); *A01K 1/033* (2013.01)

(58) Field of Classification Search
CPC .... A01K 1/0335; A01K 1/0047; A01K 1/034; A01K 1/033; A01K 1/0245
See application file for complete search history.

(56) References Cited

U.S. PATENT DOCUMENTS 1,041,167 A * 10/1912 Rogers .................. A01K 1/033 119/482
4,161,924 A * 7/1979 Welker .................. A01K 1/033 119/784
4,869,206 A * 9/1989 Spina .................... A01K 1/033 119/479
4,903,637 A * 2/1990 Devault ................. A01K 1/033 119/497
5,148,767 A * 9/1992 Torchio .................. A01K 1/035 119/484
5,727,503 A * 3/1998 Whittaker ............ A01K 1/0236 119/500
6,234,116 B1 * 5/2001 Havener ................ A01K 1/033 119/482
6,490,995 B2 * 12/2002 Greene, Jr. .......... A01K 1/0082 119/482
7,322,314 B1 * 1/2008 Sweeney ................ A01K 1/032 119/483
11,111,068 B1 * 9/2021 O'Hara .............. B65D 81/3816
12,201,082 B2 * 1/2025 Rodriguez-Palacios ..................... A01K 1/0245
2002/0023594 A1 2/2002 Greene
(Continued)

*Primary Examiner* — Jessica B Wong
(74) *Attorney, Agent, or Firm* — Lewis Rice LLC

(57) ABSTRACT

A cooling kennel that provides cooling by non-electrically driven means and provides safety features by dissipating the force of a collision throughout the cooling medium to reduce the effect of a collision felt by an animal being transported inside the cooling kennel. The cooling kennel is cooled by inserting a cooling medium into the cooling kennel, between a protective shell and a storage shell, and conductive heat transfer transferring the heat from within the cooling kennel to the cooling medium. The duration of cooling provided by the cooling kennel is dependent on the amount and type of cooling medium inserted, as well as on the configuration of the gaps and channels between the protective shell and storage shell.

20 Claims, 16 Drawing Sheets

(56) References Cited

U.S. PATENT DOCUMENTS

| | | | | |
|---|---|---|---|---|
| 2002/0148410 | A1* | 10/2002 | Thomas | A01K 63/065 119/452 |
| 2006/0000421 | A1* | 1/2006 | Holtz | A01K 1/033 119/452 |
| 2018/0092329 | A1* | 4/2018 | Zemet | A01K 1/034 |
| 2019/0216045 | A1* | 7/2019 | Rodriguez-Palacios | A01K 1/0245 |
| 2020/0288667 | A1* | 9/2020 | Cantwell | A01K 1/033 |
| 2025/0185621 | A1* | 6/2025 | Nodhturft | G10K 11/162 |

* cited by examiner

COOLING KENNEL THAT DOES NOT REQUIRE AN ELECTRICAL SOURCE

CROSS REFERENCE TO RELATED APPLICATION(S)

This application claims the benefit of U.S. Provisional Patent Application Ser. No. 63/603,327, filed Nov. 28, 2023, the entire disclosure of which is herein incorporated by reference.

BACKGROUND OF THE INVENTION

Field of the Invention

This disclosure is related to the field of kennels or enclosures for animals, and more particularly to such enclosures that allow for cooling using non-electrically driven means.

Description of the Related Art

Any and all forms of life are dependent on the temperature around them. From plants to animals to humans, all forms of life require an environment within a certain range of temperatures to survive, and often that temperature range is relatively specific. Some plants flourish in hotter climates, while others will perish when temperatures exceed a certain level. Similarly, some animals thrive in hotter climates, like a desert, while others would not survive the heat. Humans, too, require a certain band of temperatures for survival and when temperatures get outside those limits, serious illness or even death can occur.

Some living things are more adaptive to changes in temperature than others. Humans, for example, can regularly live at virtually all temperatures and climates known on Earth. Conversely, certain reptiles, insects, and other creatures can easily die if exposed to temperatures outside a relatively narrow band for any length of time. Although, even with the versatility of humans adapting to many different temperatures, prolonged exposure to extreme temperatures, like extreme heat, can result in the death or serious illness or injury of that human. Likewise, many animals are sensitive to prolonged exposure to extreme temperatures, like heat, and if left exposed to such extreme temperatures, these temperatures can result in death or serious illness of the animal.

Humans are unique to other living things when it comes to adaptability to temperature changes and, in many respects, are less dependent on the structural functioning of their bodies and more dependent on their ability to utilize available resources. For instance, a human who is exposed to extreme climates will likely fabricate shelter and clothing from available resources, as well as utilizing fire for heating and other processes for cooling, to avoid being killed by temperature effects. Whereas, if an animal is left exposed to extreme temperatures, that animal cannot build a fire for heating or fabricate a cooling device to stay cool, which often times results in that animal perishing due to those extreme temperatures.

Humans and animals have coexisted since the beginning of human history and humans have used animals for a variety of purposes. Whether it be a source of food, clothing, transportation, worship, or companionship, the history of human's use of animals is extensive. Because of these uses, throughout history humans have transported animals with them on their travels. In ancient times, many of these animals and humans would not survive the travels due in part to being exposed to extreme temperatures. As technology and times advanced, humans began fabricating protection from the changing climates and temperatures that are encountered during travels, reducing the number of humans who did not survive the travels. However, many animals travelling still do not survive due to the fabricated protection only being suitable for humans or due to other constraints with the fabricated protection. In short, because creating protection from temperature changes is so uniquely human, the animals that humans bring with them are often not as well suited to the temperature changes or new climate, which may put the animals at greater risk of injury or death as a result of being exposed to the varying temperatures.

Over time, commonality of certain animals to certain cultures and then the movement of those cultures to different environments resulted in animals being taken to climates that they were not necessarily well suited for. For example, while a horse may be well adapted to the climate of the American west, a llama or camel typically may not be. However, as humans brought more familiar animals with them, the animals were able to survive because humans fabricated ways to control how the animals were affected by the environment. For example, animals accustomed to hotter environments could be provided with blankets and other forms of "clothing" to keep them warm, while animals adapted to cooler environments may be purposefully shorn of their fur to assist in them staying cool.

The ability of humans to construct shelter served a similar purpose to protect animals from the environmental conditions and changes. Barns, kennels, and other animal enclosures allow for specific environments to be provided for the animal. In many cases, these shelters can act as a refuge for an animal when it is not specifically being utilized by a human keeper (such as bedding in horses for the night into a barn or stable) or may act as their entire world. The latter situation is particularly common for animals maintained as pets. Reptile pets, for example, are often provided a terrarium with a more natural environment, but also utilizing a heat lamp to provide them with increased heat which they often require compared to what is comfortable for a human keeper.

In addition, many animals in the modern world are domesticated, live in the house with their human keeper, and often travel with their human keeper. As such, modern technological advances and other human constructions, such as automobiles and even houses, often need to be specifically temperature controlled to maintain a temperature suitable for both humans and animals. Most humans obtain thermal comfort in the range of 70-80° F., which is a relatively narrow band of temperatures. Humans have been relatively good at heating a structure (because of their ability to create and control fire) but generally have been relatively poor at cooling a structure. Thus, houses in hotter climates often utilized large windows to provide air flow and elements such as water fountains to regulate humidity.

In the modern world, both heating and cooling have become more focused on the harnessing of electricity. In particular, electric furnaces are often used instead of fuel burning ones (and even when fuel is burned, it has moved away from biomass combustion, such as wood burning stoves, to the utilization of more energy dense materials, such as coal, oil, or natural gas). Further, in order to make heating and cooling more efficient, the environments have typically become more sealed and better insulated. This allows for temperature control of air internal to the structure to be better maintained with less energy and makes the temperature control both more effective and more efficient. As a result, the temperature inside a human structure in the current day can typically be maintained in a narrower band, through a wider range of external temperatures, for substantially less energy input (electricity use).

While these improvements have undoubtedly made humans, and human's pets, more comfortable, they also come with one significant downside. Loss of the electrical input to drive the temperature control systems will often cause the sealed nature of the structure to both work against temperature regulation over time and prevent the ability to utilize other, older and typically less efficient methods, to be used at all. For example, as discussed above, human houses in warmer climates were originally often constructed with large windows to allow cooling via airflow. More modern structures, however, typically skip the large windows because open windows, windows capable of being opened, and even glass itself compared to alternative building materials that can be used in an opaque wall, are less efficient at keeping climate controlled air in the structure. Thus, should a climate system cease functioning in a modern house in a warmer climate, that house will often heat quicker to a higher temperature, and stay at that elevated temperature, than compared to a house which had been built without a climate control system at all.

The shutting off of electric climate control systems typically is of concern in two major situations. The first of these is disaster scenarios where an event causes widespread outage of electricity. When this type of disaster occurs during hot or cold months, which is common as strain on electrical systems are often caused by more extreme temperatures, it can result in an outage of sufficient duration that creates substantial temperature dangers if a structure remains occupied.

Another problem with the shutting off of electric systems occurs in automobiles. Similar to houses with a climate system, automobiles are also human structures where temperature is regulated. In order to provide the electricity for the climate system in automobiles, the system is typically dependent on either battery power (which is relatively short lived) or the alternator, which converts the motive force generated by the gasoline engine into electricity. This means that when an automobile is shut-off or when the power to the climate system is interrupted, the environment inside that automobile can quickly become dangerous for an animal or human locked inside. The issue can be even more extreme for automobile components that don't have ready electrical or climate system access, such as enclosed pickup truck beds or the inside of box-truck compartments.

Heat is particularly dangerous in an automobile. It has been shown that the inside temperature of a vehicle can increase by more than one degree per minute when a vehicle is parked in the sunlight, even with the windows being cracked open. This means the inside temperature can increase from an outside temperature of 90° F. (uncomfortably hot, but not highly dangerous) to well over 110° F. (which is readily dangerous) in a short window of time, regardless of if the windows are left partially cracked. The outside temperature does not even have to be as warm as 90° F., however, to be dangerous. Even when the outside temperature is as low as 70° F., which is generally considered mild, the temperature inside an automobile can reach over 100° F. in just about twenty minutes. The dangers of high temperatures in an automobile are often further exaggerated because the materials the automobile are constructed of will readily reflect or radiate heat while also providing insulation, which inhibits that heat from escaping.

While some humans may be able to survive being exposed to temperatures above 100° F. for a fair amount of time, unfortunately, many animals are not equipped to handle such temperatures. This is especially true for dogs. Dogs are only able to cool off through the pads on their feet and by panting. Thus, when a dog is locked in an automobile on a hot day and temperatures in the vehicle begin exceeding 100° F., the only option the dog has is to pant. This is typically not sufficient, particularly when the air in the vehicle is hot, which unfortunately results in many dogs dying of heat stroke in a matter of minutes. This unfortunate fact is even true when windows in the automobile are cracked because even with cracked windows there is not sufficient airflow to cool the interior of the vehicle.

Every year there are tragic stories of pets that die as a result of being left in an automobile that got too hot. While in many cases these are due to avoidable situations, such as where the pet is left inadvertently behind or left in the car for an unintended period of time, there are times where the pet is left in the vehicle intentionally. Often, when the pet is intentionally left in the vehicle, the human intended it to be for only a short period of time, but outside circumstances resulted in the owner not returning in the planned time or something else changing.

Pets are typically left in vehicles because they can't go into the location the owner has taken the vehicle to. In many of these cases, the best solution is avoidance by simply not bringing the pet in the first place. However, there are a number of situations where pets need to brought with the owner and need to be purposefully left in vehicles. One example of this is when hunting dogs need to be transported to the hunting site. Hunting dogs are often transported to the hunting site in a kennel in the back of a pickup, SUV, or larger car, each of which may or may not be temperature controlled in transit. Once arrived at the hunting location, however, the dog may not be permitted to exit the vehicle due to a number of circumstances. There could be other hunters in the area, the hunting permit may be for only a designated time, there could be a need for the human to clear the grounds, or there could be other needs and reasons for the dog to be left in the vehicle until the hunting is to begin.

Another example of when animals need to often be left in vehicles is when animals are brought to participate in pet shows. In these situations, there are usually a large number of animals present at the location and there may not be room inside to accommodate every animal at the same time. As such, the animals present at the show may not be able to be brought inside the venue until it is their turn to participate in the show. Alternatively, all the animals may not be allowed inside the venue at the same time because too many animals not presently involved with the show can result in major disruptions to the show.

An additional example of a situation where leaving animals in a vehicle may be common is when animals are brought to a training facility. Many humans take their animals to training facilities for training or daycare or other services. Some of these facilities may not permit multiple animals to be brought inside at the same time to avoid the disruption of having too many animals being in the venue at any one time, which may require the animal waiting in a vehicle.

Further, police or military dogs are often in police cruisers or military vehicles for extended periods of time and may be unable to leave the vehicle due to various reasons. Likewise, other service animals may also need to be left in a vehicle if they cannot be brought where their human keeper needs to go.

When humans bring animals with them in a vehicle and have to leave them in that vehicle, most humans attempt to regulate the temperature in the vehicle by leaving the windows at least partially opened. This, however, as stated above, is often insufficient to really provide cooling to the animal because the air is mostly stationary and there is generally not sufficient movement of the air to provide adequate cooling. Additionally, leaving the windows cracked open can also be concerning for the vehicle owner, as it allows free access to the interior of the vehicle by any passerby, which can result in damage to the car, theft of the car or contents of the car, or even theft or escape of the animal themselves, in some instances.

Alternatively, the engine may be left running and the climate control system on. In this case, the doors may be able to be locked to prevent undesired access to the vehicle interior, but the temperature becomes completely dependent on continued operation of the vehicle. Thus, should it run out of gas, or something else happen, the temperature control can readily fail and the pet can quickly be exposed to temperature extremes. Further, leaving the engine running can be undesirable because it creates pollution, creates a risk of the vehicle unintentionally moving, and costs money to use the gas required to run the vehicle or depletes the battery charge and requires the owner to make a stop to recharge the battery. Further, with the increased production and use of electric vehicles, pet owners who travel with their pet, or any other human who travels with an animal in an electric vehicle, must factor in charging stops. This can be problematic because the animal will either have to be removed from the vehicle for it to charge, or will be trapped in the charging vehicle, which often is not powered on during charging, creating the situation of extreme temperatures in the vehicle.

It should be recognized that most pets and smaller animals transported in vehicles are not transported in specialized vehicles (such as horse trailers), which can be designed for their comfort. Rather, these animals are often transported in the passenger compartment or in a separate compartment (such as a pickup truck bed). For safety, animals in these locations are often confined to portable kennels. These portable kennels can keep them from moving around inside the moving vehicle (where they can injure themselves), keep them from being moved around relative to other objects in the same vehicle (particularly in the case of sudden vehicle movement), and keep them from interfering with the actions of the vehicle operator.

The use of such kennels, however, can exaggerate the dangers when a climate control system fails or where one is not present, and can present additional dangers for the animal. The interior of a kennel may exaggerate the increased heat effects occurring in truck beds or box trucks, as kennels often lack adequate airflow and serve as essentially a hot box. The kennels also typically purposefully restrict animal movement, which can inhibit certain natural temperature regulating behaviors. Because of the temperature types of problems mentioned, a number of systems have been developed to attempt to regulate the interior temperature of kennels.

Systems currently available for cooled kennels typically either include smaller versions of the same types of climate control systems used in vehicles, or include fans to provide for air circulation due to the typically poor circulation of air in most kennels. The problems with these systems, however, is that they typically rely on an electrical system to regulate the climate control system. Typically, these climate control systems either use an external battery for power or use the vehicle itself. Because of the reliance on an electrical system, the climate control systems available for kennels are typically subject to failure via loss of on-board power and by the same issues described above for the automobile.

These kennels may also present safety concerns for the animals being transported. Because the kennels are often made of a rotomolded plastic exterior or wire framework, the exterior can easily be crushed in the event of an automobile accident. If a rotomolded plastic kennel does get crushed in an accident, there is a significant risk that the plastic exterior digs into the animal located inside the kennel, or it could possibly even pin the animal against the sides of the kennel. The kennels constructed with wire framework pose similar safety hazards in addition to the possibility of the wire from the framework coming loose and puncturing the animal located inside the kennel.

Thus, kennels that are typically used, even if they include an electrical system to regulate the climate, present multiple other safety concerns for animals being transported. For these reasons, and the reasons described further herein, there is a need for a robust kennel for animals that can protect an animal being transported in the event of a collision and that also provides adequate cooling to the animal being transported, without the need of electricity.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things is a kennel for a pet or other relatively small animal (e.g., an animal smaller than a human), which provides for increased safety of the animal when the animal is being transported inside the kennel by providing a robust structural exterior of the kennel and providing a climate control system that maintains the internal area of the kennel at a temperature cool enough for animal survival without the use of any form of electric input.

There is described herein, in an embodiment, a non-electrically driven cooling kennel for an animal, said cooling kennel comprising a storage shell having an opening, with the opening further comprising an openable door, a protective shell that is generally sized and shaped to house the storage shell, and with the protective shell having an open top and an opening that corresponds with the opening in the storage shell, a plurality of gaps and channels between the storage shell and the protective shell, and a cooling medium, with the cooling medium being inserted into one or more of the gaps and channels in the plurality of gaps and channels.

In an embodiment, the cooling kennel further includes at least one pair of wheels and a handle attached to the protective shell. In that embodiment, one wheel of the at least one pair of wheels is attached to a right side of the protective shell at a bottom corner of the end opposite the opening, and a second wheel of the at least one pair of wheels is attached to a left side of the protective shell at a bottom corner of the end opposite the opening.

In a different embodiment, the cooling kennel comprises a second pair of the at least one pair of wheels. In that embodiment, the first wheel of the second pair of wheels is positioned on the right side of the protective shell at a bottom corner of the end proximal to the opening and a second wheel of the second pair of wheels is positioned on the left side of the protective shell at a bottom corner of the end proximal to the opening.

In an embodiment, the cooling kennel further comprises a lid that is sized and shaped to fit on top of the protective shell. In that embodiment, the lid further comprises a tie down port, a latch, the latch having two ends and having a hinge pin connected to one of the two ends, the latch being attached to the lid via a hinge pin, and a connection port. In that embodiment also, the lid is secured to the protective shell by positioning the end of the latches distal to the hinge pin in the connection port.

In an embodiment of the cooling kennel, the cooling medium is chosen from the list consisting of: water and ice; ice and air; or ammonium nitrate dissolved in water.

In an embodiment of the cooling kennel, the storage shell further includes a lining that is adhered to the interior surface of the storage shell.

There is also described herein, an embodiment of the cooling kennel that further includes a temperature sensor to measure the internal temperature of the storage shell. In that embodiment, the cooling kennel also includes a display screen to display the measured temperature inside the storage shell. The display screen, in an embodiment, is located on the top of a lid that is sized and shaped to fit on top of said protective shell.

In an embodiment, the plurality of gaps and channels of the cooling kennel are generally the same height as the storage shell and are generally in a V-shaped configuration, where the top of said V-shape is proximal to the protective shell and the bottom of said V shape is proximal to the storage shell.

In some embodiments of the cooling kennel, the gaps in the plurality of gaps and channels are at least 4 inches wide. In other embodiments, the gaps are at least 2.5 inches wide. In more embodiments, the gaps are at least 8 inches wide.

In an embodiment, the cooling medium is inserted into all of gaps and channels of the plurality of gaps and channels.

In another embodiment, the cooling medium is inserted into only the gaps of the plurality of gaps and channels.

In still another embodiment, the cooling medium is inserted into only the channels of the plurality of gaps and channels.

There is also described herein, an embodiment of the cooling kennel wherein said plurality of gaps and channels form a crumpling zone and are configured to collapse in on themselves when subjected to forces exerted on said cooling kennel during a collision, wherein as said crumpling zone collapses, the force from the collision is dissipated by the kinetic energy from the collision and the kinetic energy released from elastic potential energy being converted to thermal energy and said cooling medium absorbing said thermal energy.

DETAILED DESCRIPTION OF PREFERRED EMBODIMENTS

Figure 1:
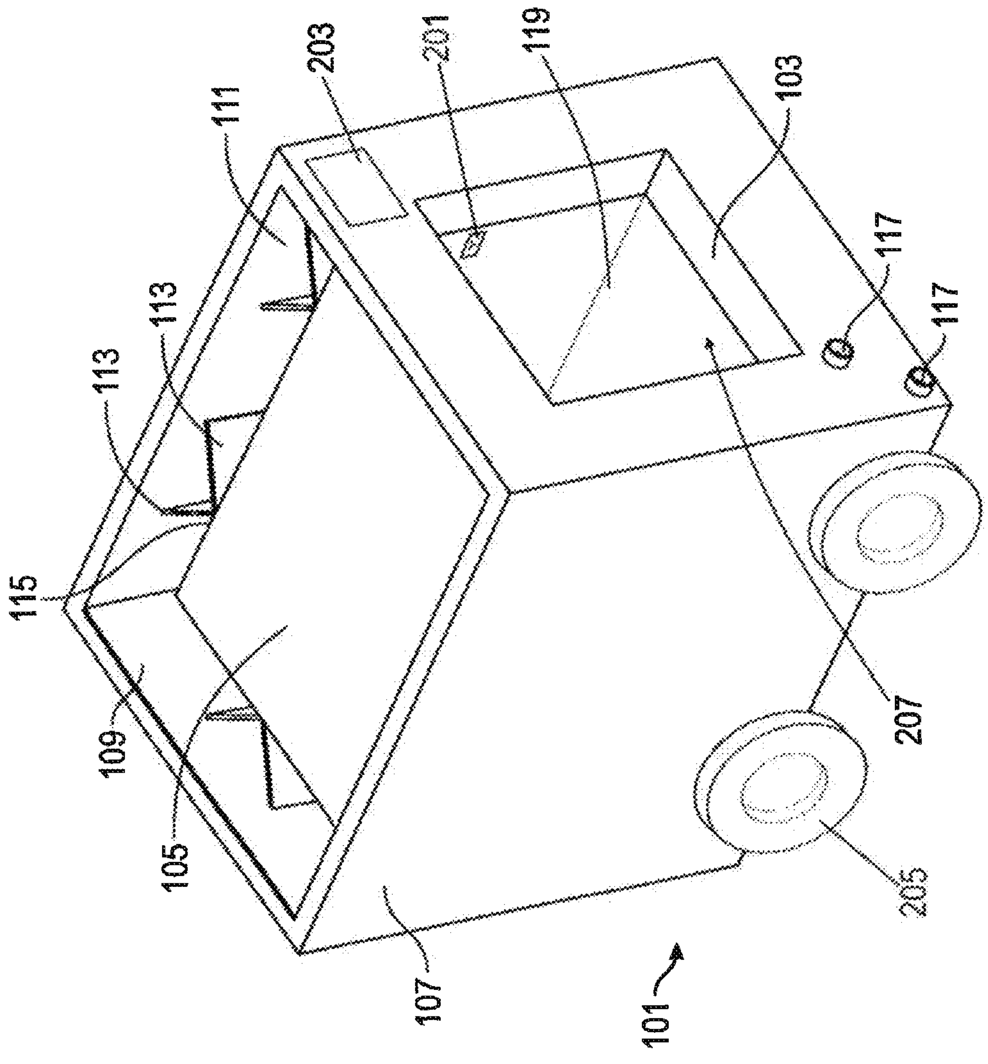
FIG. 1 depicts an isometric view of a first embodiment of a cooling kennel.

At a high level of generality, in an embodiment, the cooling kennel's structure is comprised of a storage shell (105) mounted internal to a protective shell (107), wherein the area between the storage (105) and protective shells (107) is further comprised of a series of gaps (109) and channels (111). The openings (109) (111) between the storage shell (105) and protective shell (107) are multi-purpose and may act as a shock absorber in the event the kennel is involved in a crash or accident and may also provide a space for a cooling medium to be inserted. The cooling medium enters the gaps (109) and channels (111) and, as each side of an embodiment of a cooling kennel typically contains gaps (109) and channels (111), the cooling medium effectively surrounds the animal inside the cooling kennel. These and other aspects of embodiments of the depicted cooling kennel are described in further detail herein.

Figure 2:
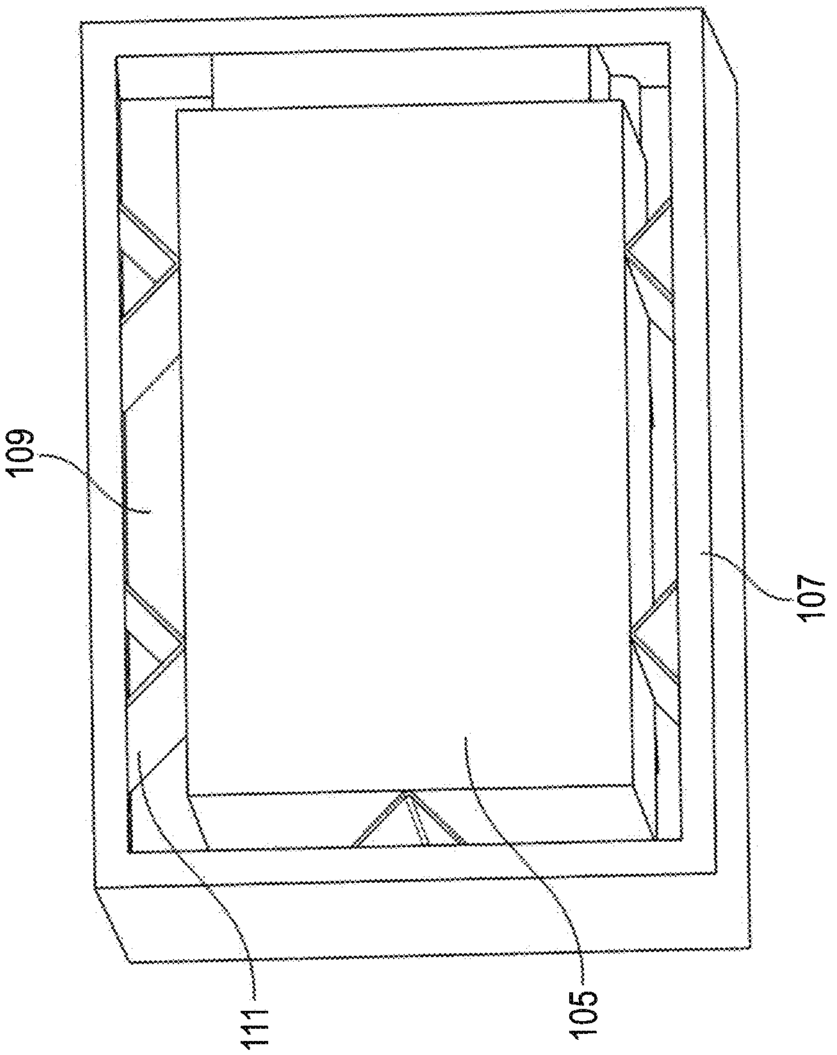
FIG. 2 depicts a top-down view of an embodiment of a cooling kennel with the top of the protective shell either removed or not present depending on the embodiment.
Figure 3:
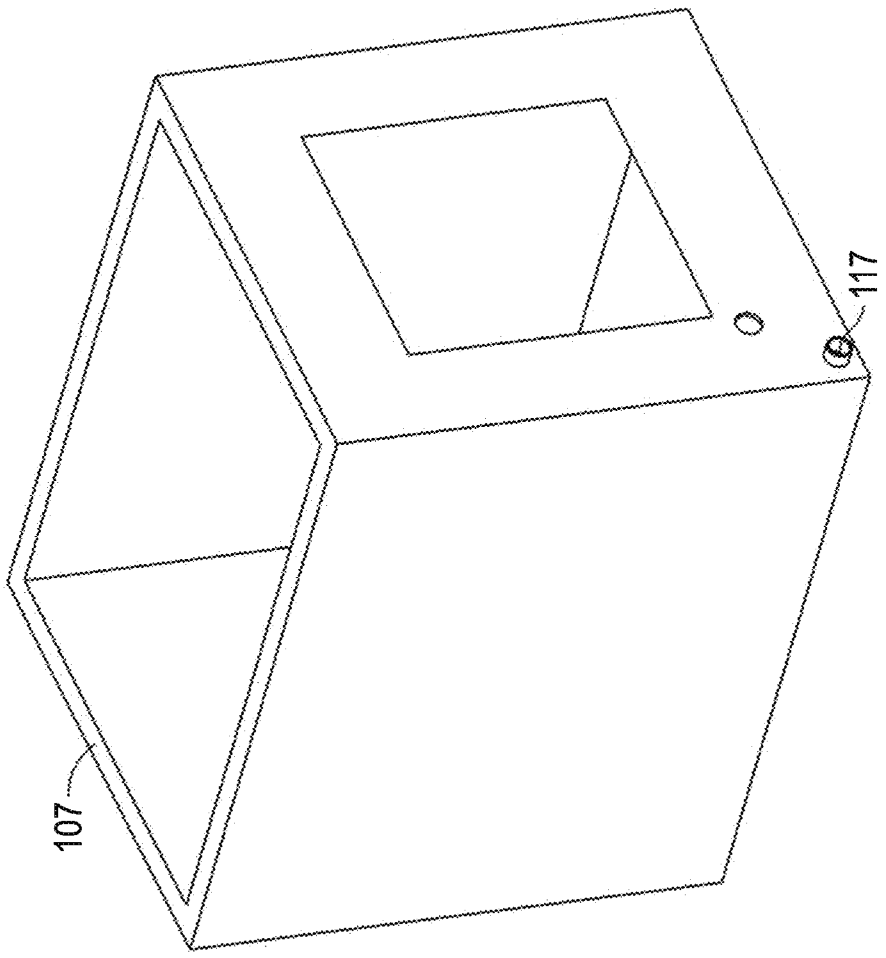
FIG. 3 depicts an isometric view of a protective shell of an embodiment of a cooling kennel.
Figure 4:
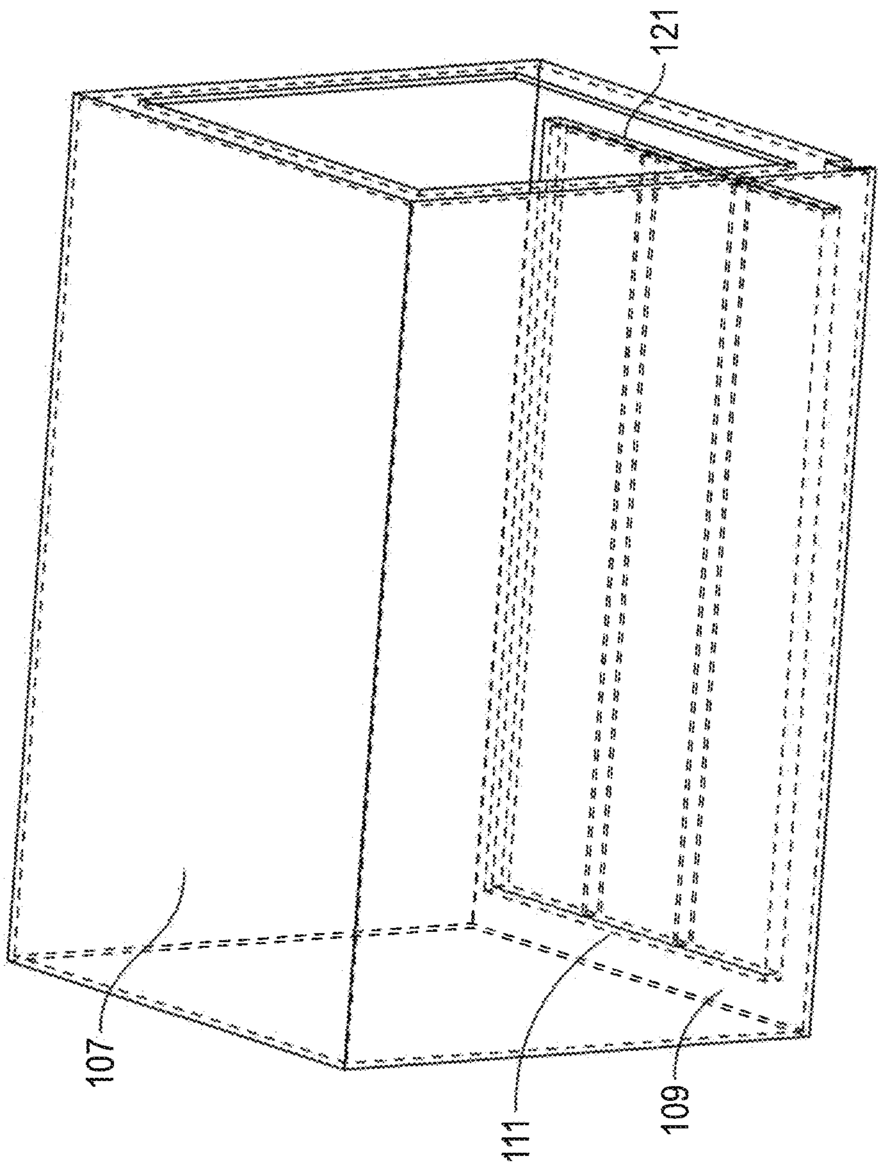
FIG. 4 depicts a view of a FIG. 3, illustrating an embodiment with gaps and channels on the lower surface of the protective shell.
Figure 5:
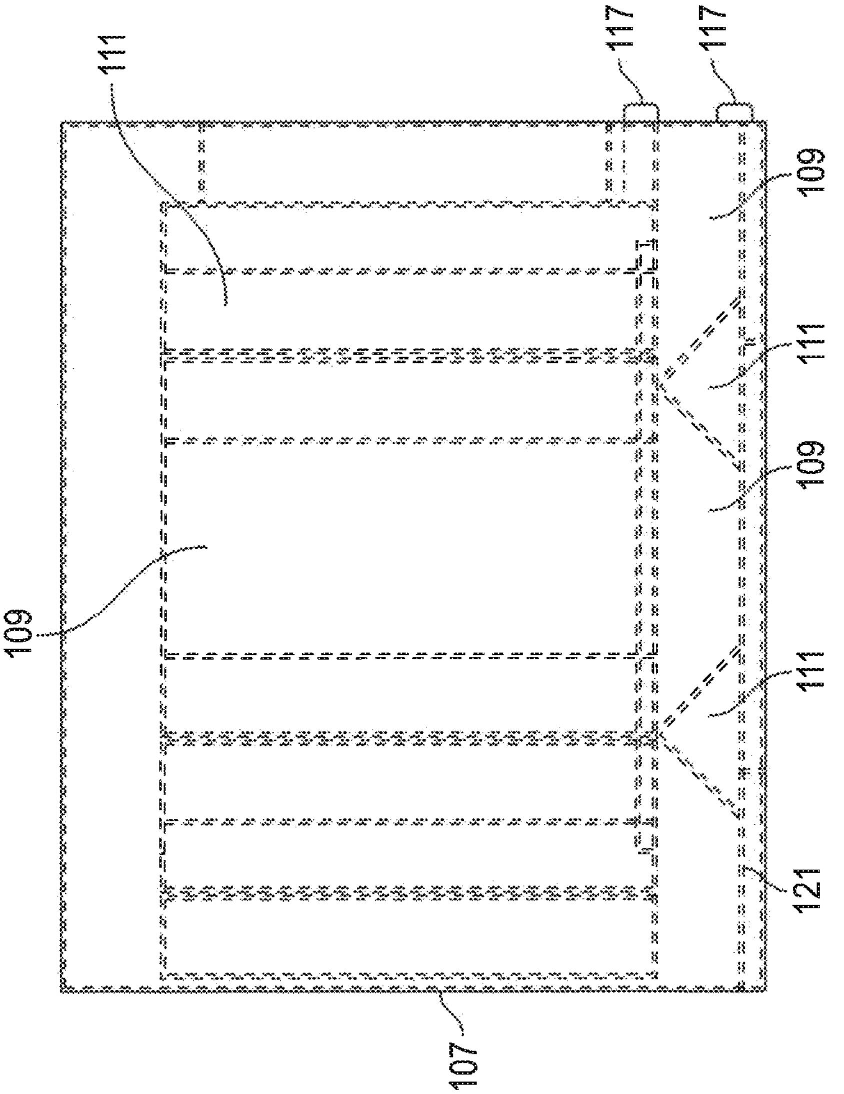
FIG. 5 depicts a view of a side of FIG. 1, better illustrating gaps and channels between an embodiment of a storage shell and protective shell.
Figure 6:
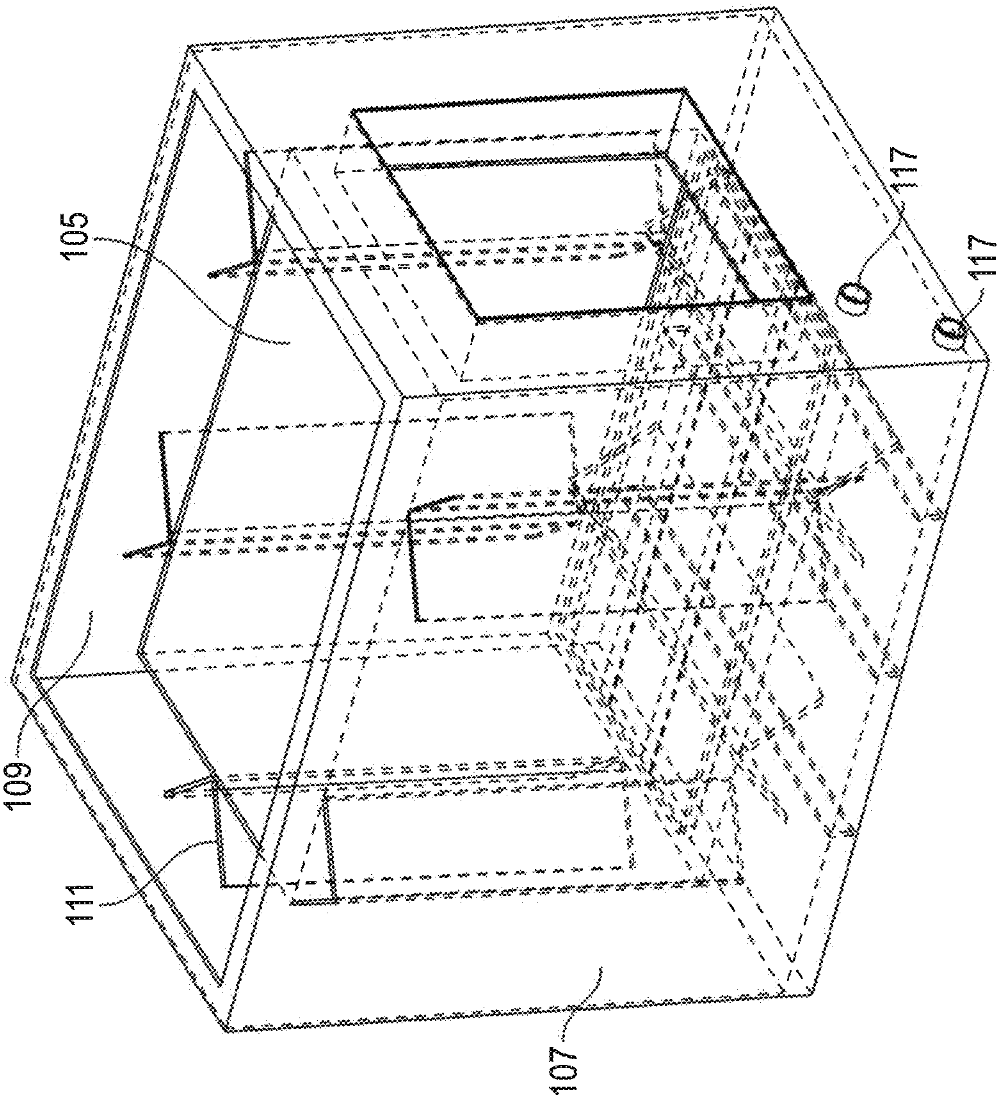
FIG. 6 depicts a view of FIG. 1, better illustrating the gaps and channels positioned between an embodiment of a storage shell and protective shell.

FIGS. 1-6 depict general embodiments of a cooling kennel (101) that does not require an electrical source according to the present disclosure. FIG. 1 depicts an isometric view of an embodiment of a cooling kennel (101) either without a top element of the protective shell (107) or with the top element removed. FIG. 2 depicts a top-down view of the cooling kennel (101) of FIG. 1, better illustrating the gaps (109) and channels (111) between the storage shell (105) and protective shell (107). FIG. 3 depicts an isometric view of the protective shell (107) of an embodiment of a cooling kennel (101). FIG. 4 depicts a view of the protective shell (107) of an embodiment of a cooling kennel (101) to better illustrate the gaps (109) and channels (111) positioned on the bottom surface of the protective shell (107). FIG. 5 depicts a view of a side of an embodiment of a cooling kennel (101) to better illustrate the gaps (109) and channels (111) positioned on the vertical and bottom surfaces of the protective shell (107). FIG. 6 depicts a view of FIG. 1, to better illustrate the positioning of the gaps (109) and channels (111) between the storage shell (105) and protective shell (107).

Figure 7:
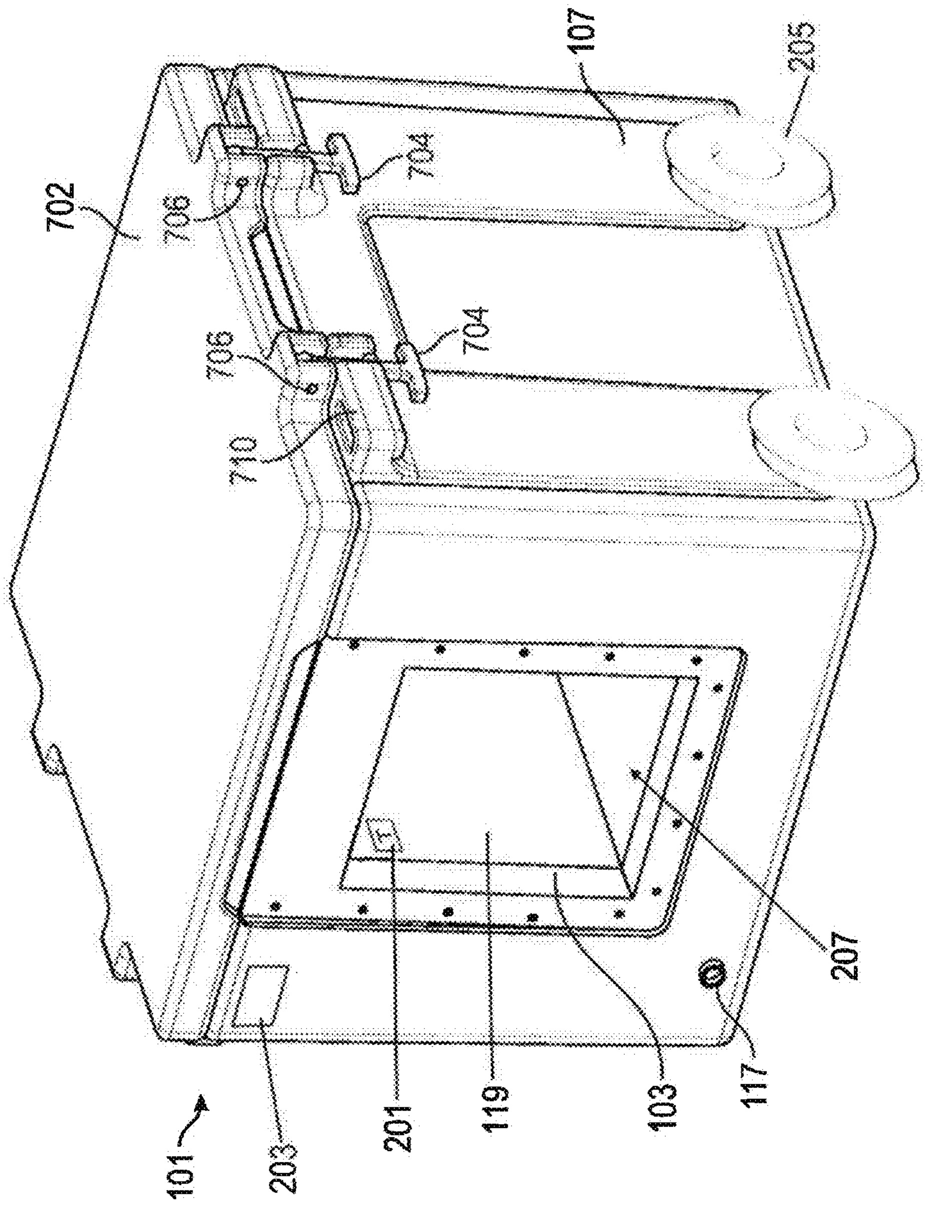
FIG. 7 depicts an isometric view of a second embodiment of the cooling kennel. The depicted cooling kennel including a removable lid or top element.
Figure 8:
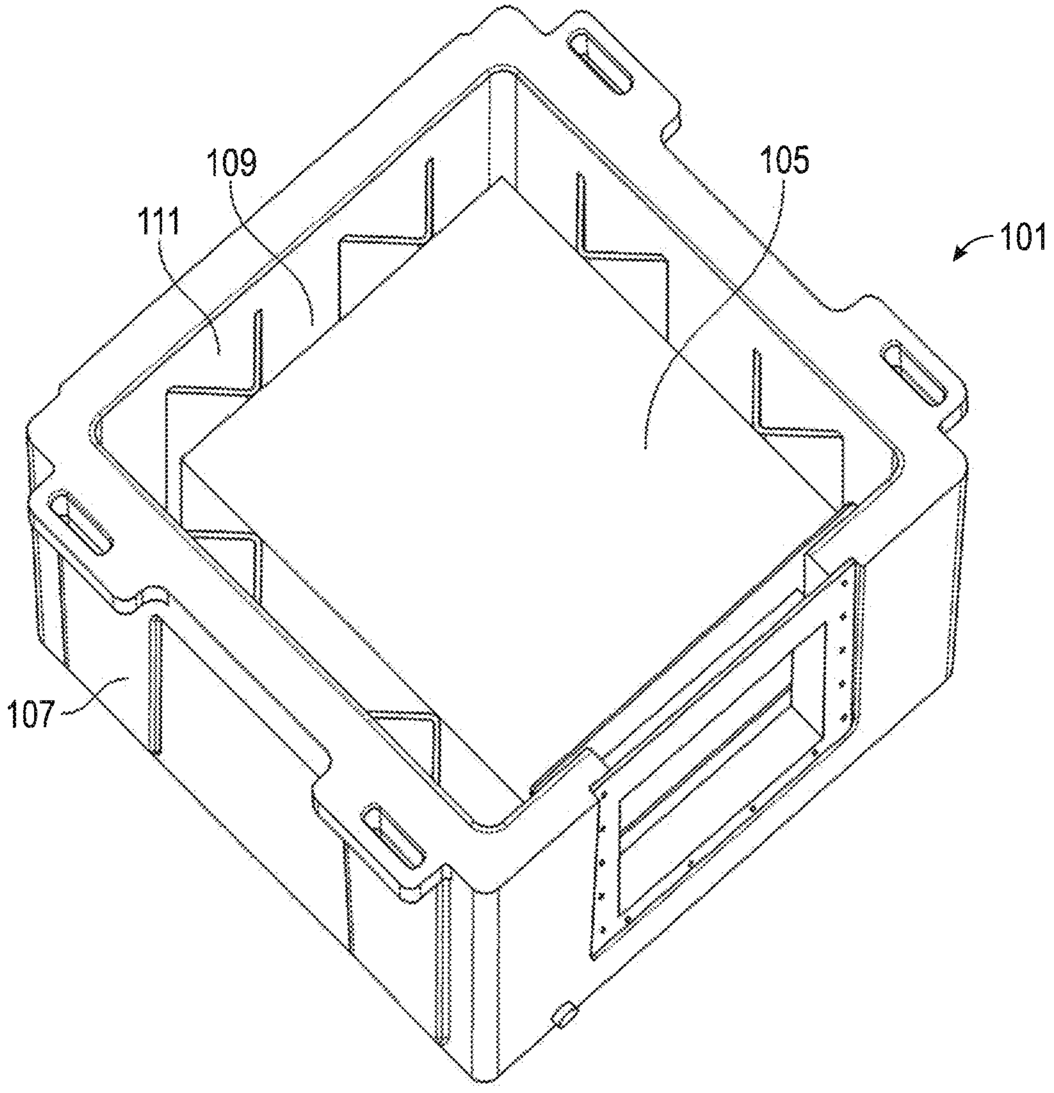
FIG. 8 depicts a top-down view of the cooling kennel of FIG. 7, illustrating the gaps and channels between the storage shell and protective shell.
Figure 9:
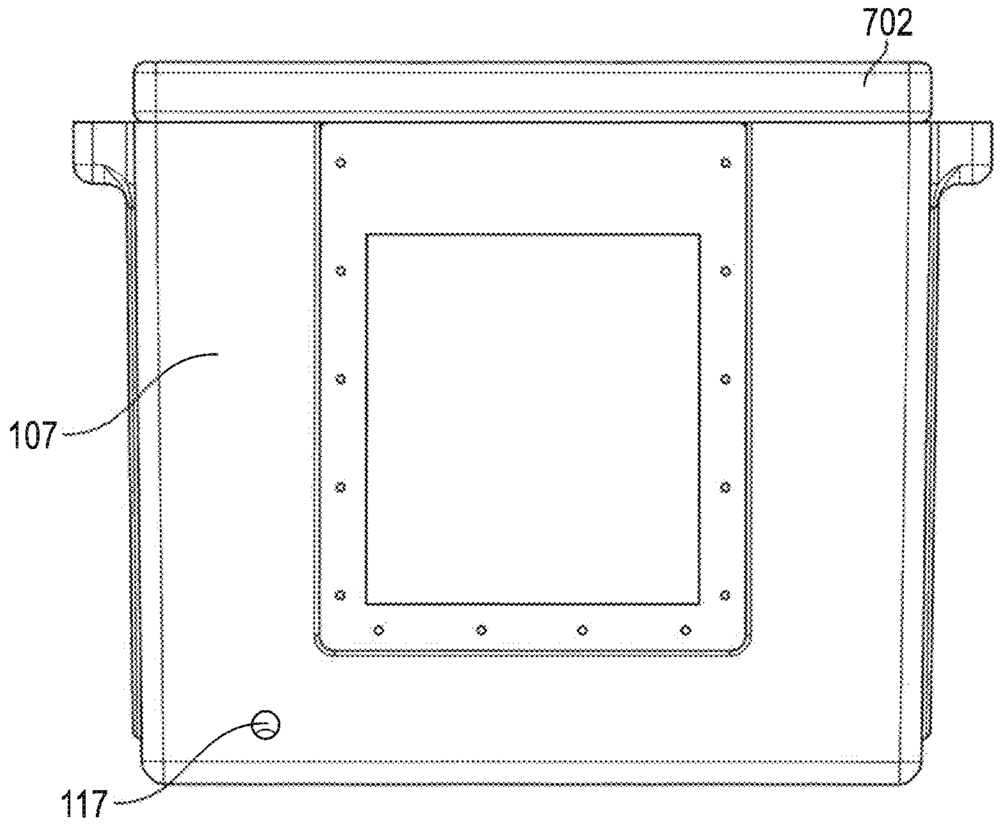
FIG. 9 depicts a front view of the cooling kennel of FIG. 7.
Figure 10:
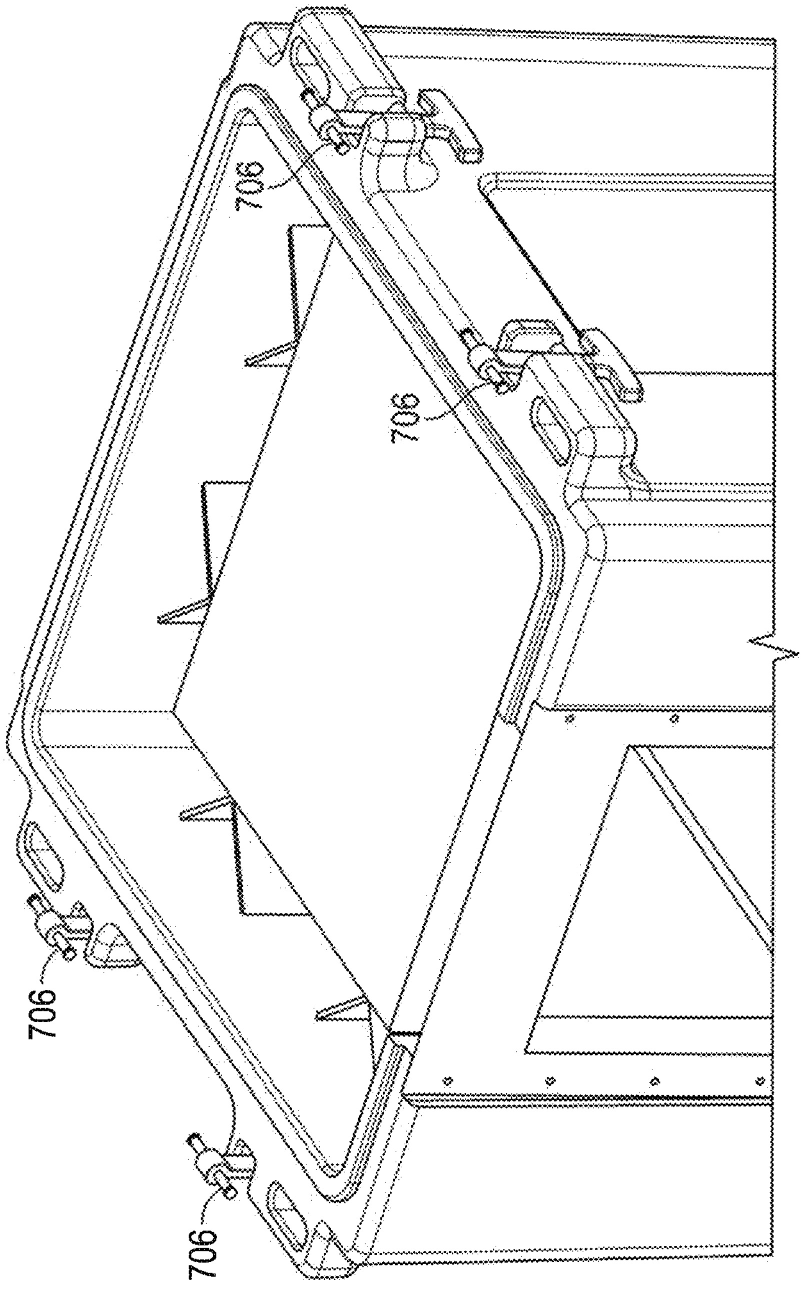
FIG. 10 depicts a perspective view of FIG. 7, with the lid hidden to better illustrate the latches and associated hinge pins.
Figure 11:
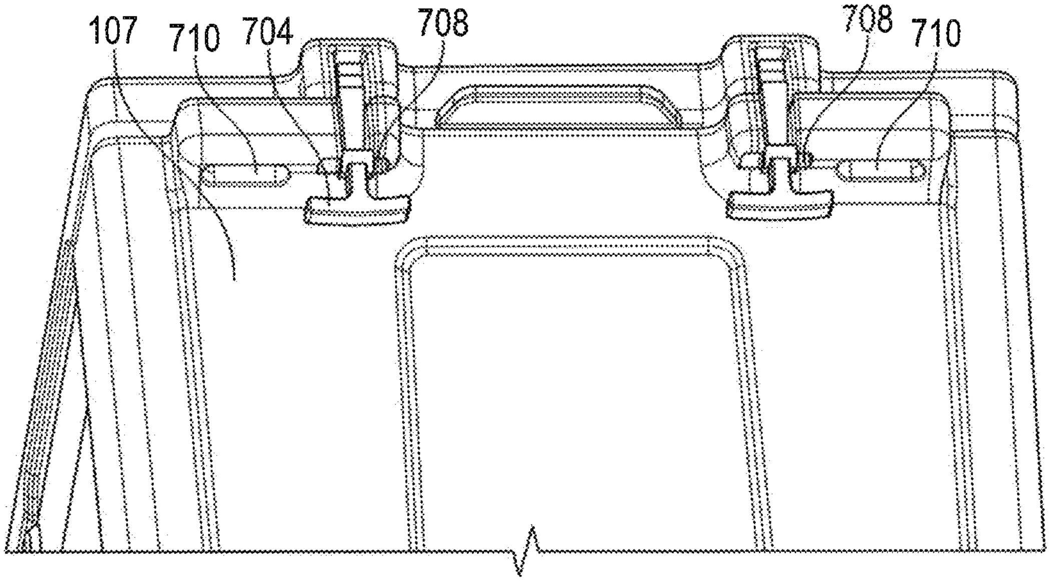
FIG. 11 depicts a perspective view of the right-side of FIG. 7, with the cooling kennel tilted to show the connection port of the latches to the protective shell.
Figure 12:
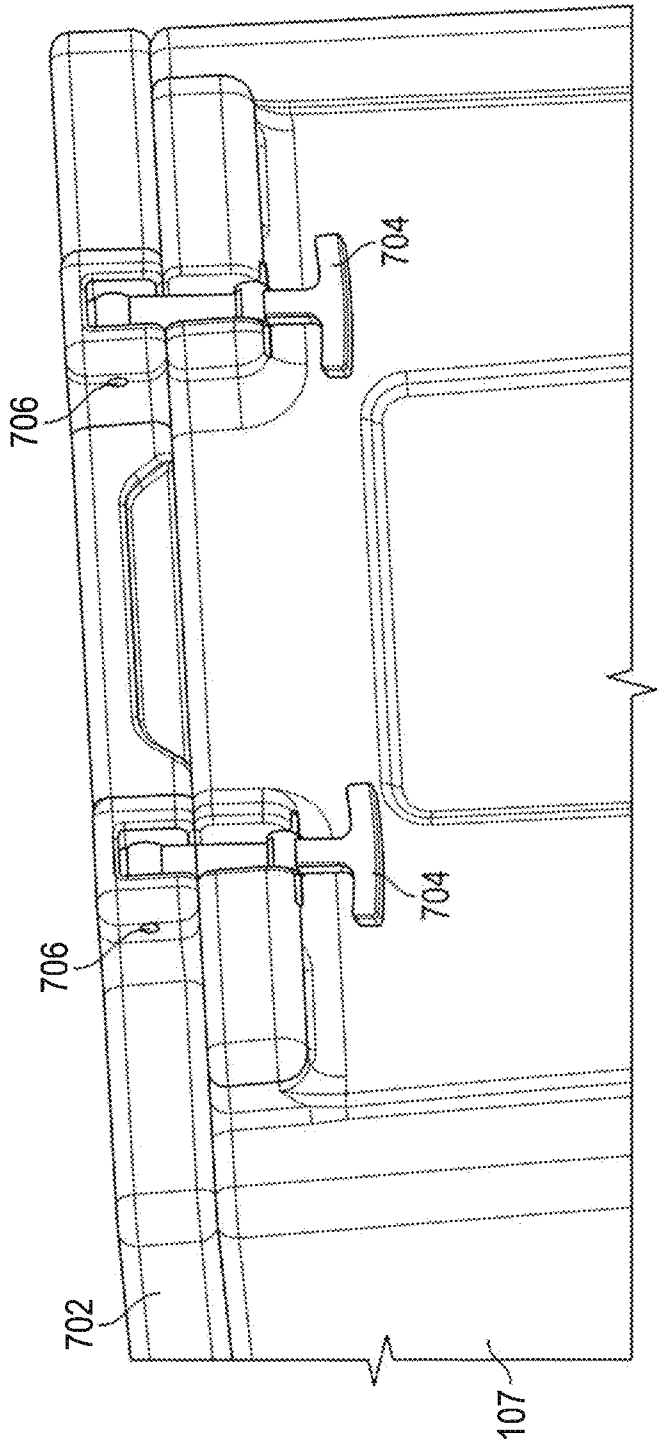
FIG. 12 shows a different angle of FIG. 11, with the hinge pins visible.
Figure 13:
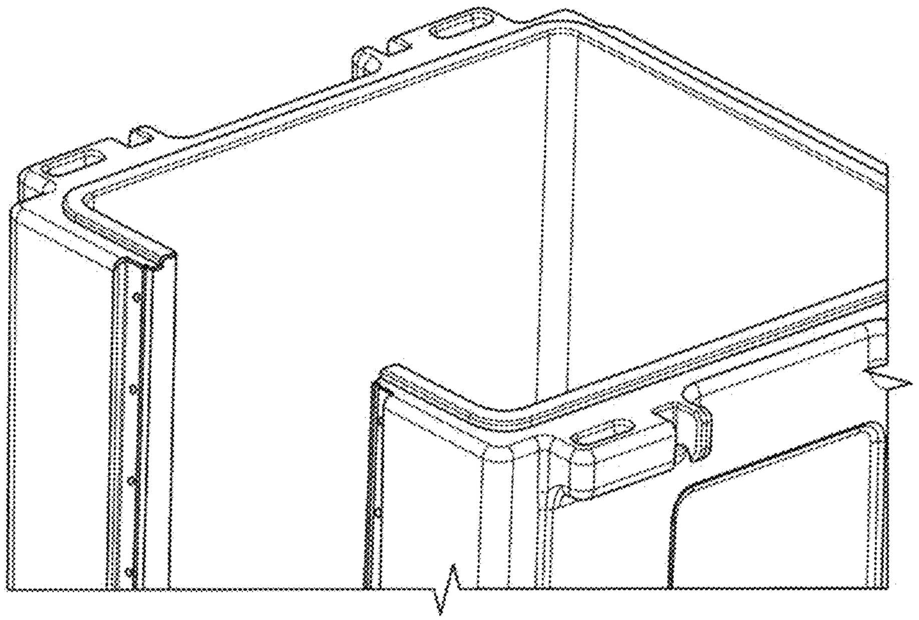
FIG. 13 depicts an isometric view of the protective shell of the embodiment depicted in FIG. 7.
Figure 14:
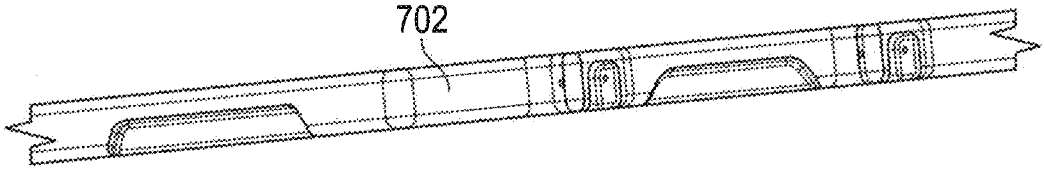
FIG. 14 depicts an isometric view of the lid of the embodiment depicted in FIG. 7, without the latches and associated hinge pins installed.
Figure 15:
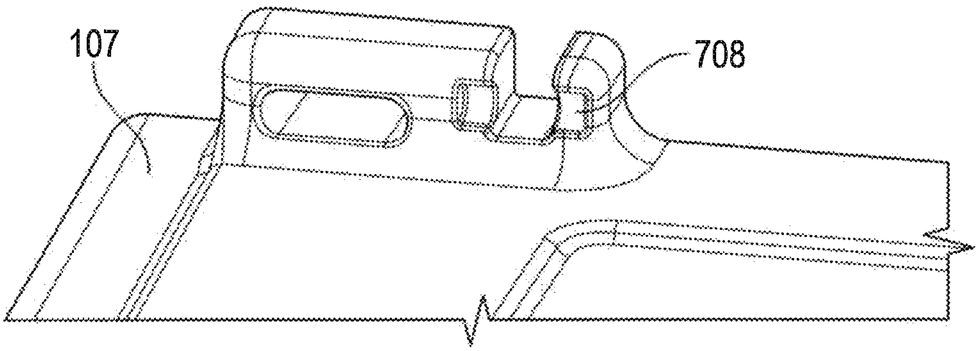
FIG. 15 depicts a zoomed in view of the latch connection protective shell of the embodiment of FIG. 7, without the latches installed, to better illustrate the connection port of the latches.
Figure 16:
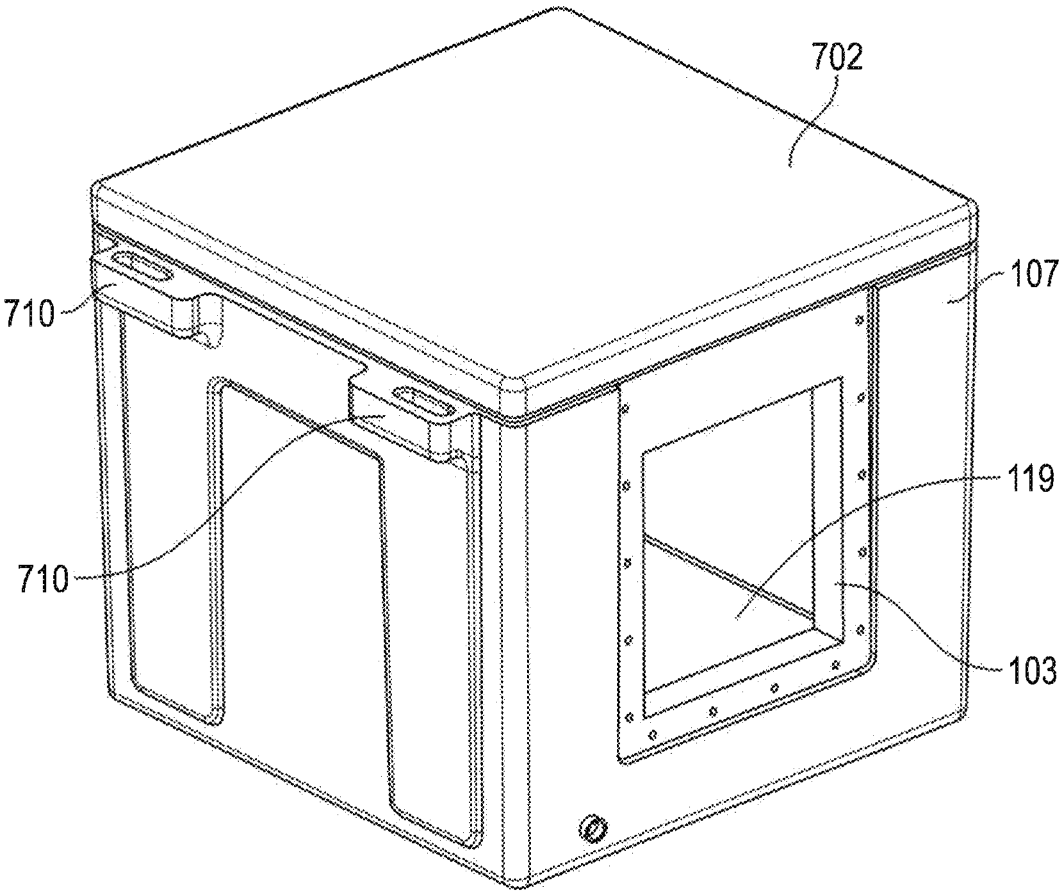
FIG. 16 depicts an isometric view of a third embodiment of the cooling kennel. This embodiment including a removable lid and tie down ports to secure the lid on the kennel.

FIGS. 7-16 depict other embodiments of a cooling kennel (101) that does not require an electrical source according to the present disclosure. FIG. 7 depicts an isometric view of a preferred embodiment of the cooling kennel depicted in FIG. 1, with the cooling kennel (101) including a removable lid or top element (702) that is secured in place via a latch (704). FIG. 8 depicts a top-down view of the cooling kennel (101) of FIG. 7, illustrating the gaps (109) and channels (111) between the storage shell (105) and protective shell (107). FIG. 9 depicts a front view of the cooling kennel (101) of FIG. 7. FIG. 10 depicts a perspective view of FIG. 7, with the lid (702) hidden to better illustrate the latches (704) and associated hinge pins (706). FIG. 11 depicts a perspective view of the right-side of FIG. 7, with the cooling kennel (101) tilted to show the connection port (708) of the latches (704) to the protective shell (107). FIG. 12 shows a different angle of FIG. 11, with the hinge pins (706) visible. FIG. 13 depicts an isometric view of the protective shell (107) of the embodiment depicted in FIG. 7. FIG. 14 depicts an isometric view of the lid (702) of the embodiment depicted in FIG. 7, without the latches (704) and associated hinge pins (706) installed. FIG. 15 depicts a zoomed in view of the latch connection (protective shell (107) of the embodiment of FIG. 7, without the latches (704) installed, to better illustrate the connection port (708) of the latches (704). FIG. 16 depicts an isometric view of a cooling kennel (101) with a removable lid (702) and with tie down ports (710) to secure the lid (702) on the kennel (101).

The depicted cooling kennel (101) is generally in the configuration of a hollow rectangular prism with an opening (103) on one side and a detachable or removable lid or top element (702), however, this configuration is by no means required, and depending on the embodiment, the top element (702) may be eliminated, leaving an open top (as depicted in FIG. 1, for example). The depicted cooling kennel (101) may be manufactured out of any generally rigid material, such as but not limited to, rotomolded plastic, injection-molded polyethylene, polypropylene, polyurethane, thermoformed plastics, aluminum, stainless steel, or any combination thereof. Depending on embodiment, the storage shell (105) may be constructed of metal to allow for improved heat transfer while the protective shell (107) may be comprised of an insulated material, or include an insulated component shell with a metal shell as part of the protective shell (107) to inhibit heat penetration into the cooling kennel (101) as a whole.

In the depicted embodiments, the opening (103) is generally centered on the front side of the kennel (101) and is smaller in size than compared to the side as a whole. However, this is by no means required and the opening (103) may be any number of sizes, varying from the entire front side to only a small portion of the side. The opening (103) will typically be closed by a detachable, hinged, articulated, or otherwise openable door (not shown). In an embodiment, the door may be louvered or grated to control air entering and leaving the kennel (101) and to ensure cool air is kept inside the storage shell (105) while hot air is expelled to the exterior environment. In another embodiment, the door may be a moveable flap that may be opened by simply pushing the flap forward, and may be kept in place by a magnet on the bottom of the flap being in contact with the lower edge of the opening (103), with the lower edge of the opening (103) being magnetic in this embodiment.

Should a top element (702) be included in the embodiment of FIG. 1, it will generally be a removable lid and in the configuration of a rectangular prism, sized and shaped to fit on top of the depicted cooling kennel (101), such as depicted in the preferred embodiments of FIGS. 7-14. In the preferred embodiments, the lid (702) may be attached to the protective shell (107) via one or more latches (704). The latches (704) are generally connected to the lid (702) via hinge pins (706) and, with the lid (702) in place on the kennel (101), the latches (704) may be secured to the protective shell (107) by positioning the end of the latches (704) distal to the hinge pin (706) in a connection port (708), as depicted in FIGS. 7, 11, and 12. The connection port (708) generally is sized and shaped to receive the latch (704) and snugly hold the latch (704) in place.

However, attaching the lid in this manner is not required and, in alternative embodiments, the lid (702) may be attached to the cooling kennel (101) via hinges on one longitudinal side. In further embodiments, the lid (702) may be attached to the cooling kennel (101) via hinges on one latitudinal side. In yet other embodiments, the lid (702) may be further comprised of a sealing mechanism, such as a gasket, that pressure seals the lid (702) onto the cooling kennel (101) when the lid (702) is installed. In still other embodiments, such as depicted in FIG. 16, the lid (702) may be attached to the cooling kennel (101) by use of straps that are placed through the tie down ports (710) and wrapped laterally around the cooling kennel (101). In some embodiments, the cooling kennel (101) may even include a combination of any of these methods of attaching the lid (702) to the protective shell (107), such as embodiments that include the latches (704) and connection port (708) as well as the tie down port (710).

The storage shell (105) and protective shell (107) of the cooling kennel (101) in the depicted embodiments generally are configured with a gap (109) between the storage shell (105) and protective shell (107). The gap (109) between these shells (105) (107) generally comprises a series of channels (111), as best depicted in FIGS. 2, 8, and 10. As depicted in FIGS. 2, 5, 6, 8, and 10 these channels (111) are generally positioned in the gaps (109) on the bottom side and each of the vertical sides of the cooling kennel (101). The channels (111) may be interconnected so that channels (111) on vertical sides are in fluid communication with the channels (111) in the bottom side and/or any of the other vertical sides. Alternatively, the channels (111) may exist independently on each other on each of the vertical sides and/or the bottom side. In a still further embodiment, the gaps (109) and/or channels (111) may be completely fluidly independent of any other structure such as by having the vertical sides completely fluidly separated from the bottom side and each other. In a still further embodiment, the top side may also include a series of channels (111) and also have a gap (109) between the storage (105) and protective shell (107)

In the depicted embodiments, the channels (111) generally run the length of the height of the wall they are located on and generally are in a V-shaped configuration, with the top of the V (113) in the direction of the protective shell (107) and the bottom of the V (115) in the direction of the storage shell (105). This is, however, by no means required and the channels (111) may be of any shape. As best depicted in FIG. 5, in the depicted embodiments, the channels (111) on the bottom side rest atop an elevated surface (121) such that the top of the V (113) is in the direction of the elevated surface (121) and the bottom of the V (115) is in the direction of the storage shell (105).

In the depicted embodiments, the gap (109) between the storage shell (105) and protective shell (107) is at least 4 inches. However, this is by no means required and in other embodiments the gap (109) is 2.5 inches. In still further embodiments, the gap (109) is at least 8 inches in width. The variations in the gap (109) width provide additional cooling duration by providing space for more cooling medium to be inserted, depending on the circumstances. Further, selection of the specific size of the gap (109) can also depend on the size of the animal to be transported in the cooling kennel (101), the total desired size of the cooling kennel (101), total weight of the cooling kennel (101), and/or other practical considerations not directly linked to the cooling capability of the cooling kennel (101).

In the depicted embodiments, the cooling kennel (101) comprises a valved drain line, with the drain valve (117) positioned at or near a bottom corner of the front wall. In this embodiment, the drain valve (117) may be opened to expel the cooling medium, described elsewhere herein, from the gaps (109) and channels (111) between the storage (105) and protective (107) shells of the cooling kennel (101). However, this placement is by no means required and other embodiments position the drain valve (117) on a longitudinal side of the cooling kennel. In yet other embodiments, there is no drain line or drain valve (117) and the cooling medium is expelled by turning the cooling kennel (101) upside down.

The storage shell (105) of the depicted embodiments may be lined with a lining (207). The lining (207) may be adhered to the interior of storage shell (105) via a chemical adhesive or a mechanical adhesive, such as Velcro, or by similar methods. The lining (207) will often be made of a relatively thin material that is durable and provides cushioning support, such as a neoprene foam type material. However, this material selection is by no means required and other materials which are durable and provide cushioning support may also be used. The lining (207) may also be selected to limit the heat transfer from the cooling medium to the interior surfaces of the storage shell (105). For example, a foam or shaggy material may be used which includes substantial air trapping, to ensure the interior surface (119) of the bottom wall of the storage shell (105), where the animal will be directly touching, does not become too cold and could cause discomfort for an animal standing or laying on the bottom interior surface. Selection of a particular material could also be made based on the expected environment the cooling kennel (101) is intended to be used in, or could be based on the type or breed of animal to be carried. This can allow for the interior compartment of the cooling kennel (101), where the animal is located, to have a resultant temperature which is higher or lower without having to alter the cooling medium (as discussed later) used in the cooling kennel (101).

Rather than use an electric input that can be disrupted or even lost, the cooling kennel (101) according to the present disclosure's cooling relies entirely on physical properties of materials which effectively cannot be lost, such as materials with a low temperature, high latent heat of fusion, high heat absorption, or materials that produce endothermic reactions. The cooling medium is generally water ice and water or air, but this is certainly not required and the cooling medium may be any material desired by the user. For example, in an embodiment, the cooling medium is ammonium nitrate dissolved in water, which absorbs heat from its surroundings during the endothermic dissolution process. After the cooling medium is inserted, the heat from the warmer region, i.e., the interior (119) of the storage shell (105) where the animal is located, is transferred to the colder region, and the heat is absorbed in the cooling medium, causing the temperature of the interior of the storage shell (105) to decrease. Essentially, the cooling medium uses conduction heat transfer to remove the heat from interior (119) of the storage shell (105).

In the depicted embodiments, a material to serve as a cooling medium is inserted in the openings between the storage (105) and protective (107) shells. There are multiple embodiments of inserting the cooling medium. The cooling medium, for example, may be inserted such that it enters both the gaps (109) and channels (111) of the cooling kennel (101), only the gaps (109) and not the channels (111), only the channels (111) and not the gaps (109), or a combination of the gaps (109) and some of the channels (111), depending on the cooling needs.

Because the channels (111) are generally configured with only a small surface area of the channels (111) in contact with the storage shell (105), inserting the cooling medium into only the channels (111) will provide the lowest level of cooling, which may be desirable in certain circumstances. This embodiment will generally serve to cool the air between the storage (105) and protective (107) shells to provide minimal cooling benefits by transferring a portion of the heat in the interior of the storage shell (105) to the air in the opening between the storage (105) and protective (107) shells, and then to the outside air.

Conversely, the embodiment of inserting the cooling medium into only the gaps (109) and not the channels (111) will provide increased cooling benefits as compared to only inserting the cooling medium into the channels (111) because the gaps (109) have a larger surface area in contact with the storage shell (105). In this embodiment, the channels (111) being void of the cooling medium may serve to reduce the amount of time the cooling characteristics of the cooling medium are beneficial, which may be desirable in certain circumstances. In this embodiment, the channels (111) are generally filled with air, which is typically warmer than the temperature of the cooling medium, and the sides of the channels (111) are in contact with the cooling medium inserted in the gaps (109). This provides additional warmer surfaces for the cooling medium to be in contact with, which in turn, heats the cooling medium quicker and reduces the amount of time the cooling medium is at or below a temperature suitable for conduction heat transfer.

In an embodiment to maximize the cooling benefits, the cooling medium is inserted into both the gaps (109) and the channels (111). In this embodiment, the cooling medium in the gaps (109) serve as the primary heat remover and the cooling medium inserted in the channels (111) insulates the cooling medium in the gaps (109) and removes heat from the cooling medium in the gaps (109). This may allow for additional heat to be absorbed by the cooling medium in the gaps (109) and, thus, maximizing the duration of cooling by increasing the time it takes the cooling medium in the gaps (109) to reach a temperature no longer suitable for transferring the heat out of the interior of the storage shell (105). This embodiment can further be configured of cooling medium inserted in the gaps (109) and some, but not all, of the channels (111) to lengthen the cooling duration but not maximize the duration, depending on the desired circumstances.

In some embodiments, the cooling kennel (101) also includes a thermometer or other temperature sensor (201)

positioned inside the storage shell (105) to measure the internal temperature of the cooling kennel (101). In such an embodiment, the thermometer or temperature sensor (201) may be electrically connected to a display screen (203) that is positioned on the outside of the cooling kennel (101), allowing the internal temperature of the storage shell (105) to be readily discernible. The display screen (203) may be a battery operated electronic display, or may be an analog depiction of the temperature inside the storage shell (105). In an alternative embodiment, the cooling kennel (101) may include the thermometer or temperature sensor (201) to measure the internal temperature of the storage shell (105) with the display screen (203) showing the temperature measurement capable of being placed outside the vehicle that the cooling kennel (101) is inside of, such that the temperature may be viewed without requiring the vehicle to be entered.

Depending on the cooling medium chosen, the addition of the cooling medium may cause the weight of the cooling kennel (101) to increase beyond a safe weight for humans to carry. Resultingly, in some embodiments, the cooling kennel (101) may further comprise wheels (205) and a handle to facilitate moving the cooling kennel (101). The wheels (205) may be positioned in multiple locations, depending on the needs and circumstances that the cooling kennel (101) will be used in. For instance, in some embodiments, the cooling kennel (101) may include two wheels (205), with one positioned on the left side of the cooling kennel (101) on the end opposite the opening (103) and the other positioned on the right side of the cooling kennel (101) on the end opposite of the opening (103). In other embodiments, the cooling kennel (101) may include four wheels (205), one located at each corner of the cooling kennel (101), and in further embodiments, the wheels (205) may be retractable. Similarly, the handle that may be included in some embodiments may be positioned in multiple locations. For instance, the handle may be located at the front of the cooling kennel (101), proximal the opening (103), or may be at the back of the cooling kennel (101), at the end opposite the opening (103). In further embodiments, the handle may even extend upwards from a side of the protective shell (107). In still further embodiments, the cooling kennel (101) may include other structures to assist in moving or transporting the cooling kennel (101). For example, the cooling kennel (101) may include openings on the outside of the protective shell (107) for attachment to a forklift, a hand-lift, a crane, an overhead lift, or other lifting devices.

In addition to the above, the depicted cooling kennel (101) may also provide additional safety features that reduce the force exerted on the kennel (101) and animal inside during a collision or accident. Typically during collisions or accidents, the kinetic energy from the object moving is transferred to elastic potential energy stored in the compression of the materials and then released as kinetic energy again. This results in a force from the initial kinetic energy, a bouncing effect as the potential energy is released back to kinetic energy, and a subsequent force exerted by the release of that kinetic energy. Because energy can be neither created nor destroyed, only transferred or converted into another form of energy, these energy forces resultingly are exerted upon the object traveling, such as a kennel being transported in a vehicle and the animal inside the kennel. An embodiment of the cooling kennel (101) provides a crumpling zone that may absorb a portion of these forces exerted on the kennel and animal inside during an accident or collision. The gaps (109) and channels (111) between the storage (105) and protective (107) shells, combined with the cooling medium when it is inserted, are designed to work in concert as the crumpling zone.

The crumpling zone reduces the force exerted on the cooling kennel (101) during a collision or accident by dispersing the energy throughout the gaps (109), channels (111) and cooling medium. This dispersion of energy may reduce the forces of impact and minimize bouncing effects, as the dispersion effectually disforms the area of the crumpling zone and absorbs the energy that otherwise would be exerted on the kennel (101) and transferred to the animal inside. As the crumpling zone absorbs this energy, the crumple zones may become deformed, which provides for a means of transferring and converting the kinetic energy, both the initial kinetic energy and the kinetic energy released from elastic potential energy, from the crash into thermal energy that is then absorbed in the cooling medium. The cooling medium may also dissipate force by converting energy into kinetic energy of its movement. This may be relative movement for example in the form of flow within the channels (111) or gaps (109) or may be through discharge of the cooling medium through cracks in the protective shell (107) formed due to the impact of the accident. As such, this deformation of materials is not only expected, it is desired, and may result in a less severe impact which may improve the overall safety of the cooling kennel (101).

The qualifier "generally" and similar qualifiers, as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally," and relationships contemplated herein regardless of the inclusion of such qualifiers, to include a range of variations from the literal geometric meaning of the term in view of these and other considerations.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A non-electrically driven cooling kennel for an animal, said cooling kennel comprising:

a storage shell having an opening, a bottom side, and four vertical sides;

said opening further comprising an openable door;

a protective shell generally sized and shaped to house said storage shell, said protective shell having an open top and having an opening corresponding to said opening of said storage shell;

a plurality of gaps and channels, wherein the gaps are defined as the space between said protective shell and said storage shell;

wherein said gaps generally comprise said channels and said channels are positioned along at least one of said vertical sides of said storage shell; and a cooling medium, said cooling medium inserted into one or more gaps and channels in said plurality of gaps and channels.

2. The cooling kennel of claim 1, further comprising at least one pair of wheels.

3. The cooling kennel of claim 2, further comprising a handle attached to said protective shell.

4. The cooling kennel of claim 3, wherein a first wheel of said at least one pair of wheels is attached to a right side of the protective shell at a bottom corner of the end opposite said opening and a second wheel of said at least one pair of wheels is attached to a left side of the protective shell at a bottom corner of the end opposite said opening.

5. The cooling kennel of claim 4, further comprising a second pair of said at least one pair of wheels, wherein a first wheel of said second pair of said at least one pair of wheels is attached to the right side of the protective shell at a bottom corner of the end proximal to said opening and a second wheel of said second pair of said at least one pair of wheels is attached to the left side of the protective shell at a bottom corner of the end proximal to said opening.

6. The cooling kennel of claim 1, further comprising a lid, said lid being sized and shaped to fit on top of said protective shell.

7. The cooling kennel of claim 6, wherein said lid further comprises:

a;

a latch, said latch having two ends and having a hinge pin connected to one of said two ends;

said latch being attached to said lid via said hinge pin; and wherein said protective shell further comprises a connection port, said connection port configured to receive the end of said latch distal to said hinge pin.

8. The cooling kennel of claim 7, wherein said lid is secured to said protective shell via positioning the end of said latches distal to said hinge pin in said connection port.

9. The cooling kennel of claim 1, wherein said cooling medium is chosen from the list consisting of: water and ice; ice and air; or ammonium nitrate dissolved in water.

10. The cooling kennel of claim 1, wherein said storage shell further comprises a lining adhered to the interior surface of said storage shell.

11. The cooling kennel of claim 1, wherein the storage shell further comprises a temperature sensor to measure the internal temperature of said storage shell.

12. The cooling kennel of claim 11, further comprising a display screen displaying the temperature reading from said temperature sensor.

13. The cooling kennel of claim 12, wherein said display screen is located on the top of a lid that is sized and shaped to fit on top of said protective shell.

14. The cooling kennel of claim 1, wherein the channels are generally the same height as said storage shell and are generally in a V-shaped configuration, where the top of said V-shape is proximal to said protective shell and the bottom of said V shape is proximal to said storage shell.

15. The cooling kennel of claim 1, wherein the gaps are at least 4 inches wide.

16. The cooling kennel of claim 1, wherein the gaps are at least 2.5 inches wide.

17. The cooling kennel of claim 1, wherein the cooling medium is inserted into all of the gaps and channels.

18. The cooling kennel of claim 1, wherein the cooling medium is inserted only into the.

19. The cooling kennel of claim 1, wherein the cooling medium is inserted only into the channels.

20. The cooling kennel of claim 1, wherein said plurality of gaps and channels form a crumpling zone and are configured to collapse in on themselves when subjected to forces exerted on said cooling kennel during a collision, wherein as said crumpling zone collapses, the force from the collision is dissipated by the kinetic energy from the collision and the kinetic energy released from elastic potential energy being converted to thermal energy and said cooling medium absorbing said thermal energy.

* * * * *